(12) United States Patent
Tsuda et al.

(10) Patent No.: US 10,785,692 B2
(45) Date of Patent: Sep. 22, 2020

(54) METHOD AND USER EQUIPMENT FOR MOBILITY AND CLASSIFICATION BASED RESTRICTED MEASUREMENT LIST CREATION IN VIRTUAL CELLS

(71) Applicant: Sony Corporation, Tokyo (JP)

(72) Inventors: Shinichiro Tsuda, Basingstoke (GB); Hideji Wakabayashi, Basingstoke (GB); Brian Alexander Martin, Basingstoke (GB); Yuxin Wei, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/314,449

(22) PCT Filed: Jun. 28, 2017

(86) PCT No.: PCT/EP2017/066016
§ 371 (c)(1),
(2) Date: Dec. 31, 2018

(87) PCT Pub. No.: WO2018/002150
PCT Pub. Date: Jan. 4, 2018

(65) Prior Publication Data
US 2019/0349824 A1  Nov. 14, 2019

(30) Foreign Application Priority Data

Jun. 30, 2016 (EP) ..................................... 16177211

(51) Int. Cl.
*H04W 36/00* (2009.01)
*H04W 36/32* (2009.01)

(52) U.S. Cl.
CPC . *H04W 36/00835* (2018.08); *H04W 36/0027* (2013.01); *H04W 36/0085* (2018.08); *H04W 36/32* (2013.01)

(58) Field of Classification Search
CPC ............. H04W 36/36; H04W 36/0061; H04W 36/0083; H04W 36/08; H04W 36/0094; H04W 36/00835; H04W 36/32
See application file for complete search history.

(56) References Cited

U.S. PATENT DOCUMENTS

2008/0188215 A1  8/2008  Bergstrom et al.
2014/0335865 A1  11/2014  Zhang et al.
2014/0370899 A1*  12/2014  Hole ................. H04W 36/0094
                                                                    455/437

(Continued)

OTHER PUBLICATIONS

International Search Report dated Nov. 14, 2017 for PCT/EP2017/066016 filed on Jun. 28, 2017, 16 pages.

(Continued)

*Primary Examiner* — Diane D Mizrahi
(74) *Attorney, Agent, or Firm* — Xsensus LLP

(57) ABSTRACT

In a mobile telecommunications system method neighboring cell list information indicating neighboring cells is obtained. Classification information of cells in the neighboring cell list information is obtained. A mobility state of a user equipment is obtained, and selecting at least one candidate cell to be measured is selected based on the neighboring cell list information, the classification information and the mobility state of the user equipment.

20 Claims, 6 Drawing Sheets

(56) References Cited

U.S. PATENT DOCUMENTS

2015/0036663 A1 2/2015 Kilpatrick, II et al.
2017/0006512 A1* 1/2017 Hole ................. H04W 36/0094

OTHER PUBLICATIONS

ETSI, "User Equipment (UE) procedures in idle mode", 3GPP TS 36.304 version 13.0.0 Release 13, ETSI TS 136 304 V13.0.0, Feb. 2016, 44 pages.
ETSI, "Radio Resource Control (RRC); Protocol specification", 3GPP TS 36.331 Version 13.0.0 Release 13, ETSI TS 136 331 V13.0.0, Jan. 2016, 670 pages.

* cited by examiner

METHOD AND USER EQUIPMENT FOR MOBILITY AND CLASSIFICATION BASED RESTRICTED MEASUREMENT LIST CREATION IN VIRTUAL CELLS

CROSS-REFERENCE TO RELATED APPLICATIONS

This application is a National Stage Application based on PCT/EP2017/066016, filed on 28 Jun. 2017, and claims priority to European Patent Application No. 16177211.6, filed on 30 Jun. 2016, the entire contents of which being incorporated herein by reference.

TECHNICAL FIELD

The present disclosure generally pertains to a method and a user equipment for a mobile telecommunications system.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

The candidate for providing the requirements of 5G is the so called Long Term Evolution ("LTE"), which is a wireless communication technology allowing high-speed data communications for mobile phones and data terminals and which is already used for 4G mobile telecommunications systems.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies.

LTE is standardized under the control of 3GPP ("3rd Generation Partnership Project") and there exists a successor LTE-A (LTE Advanced) allowing higher data rates than the basic LTE and which is also standardized under the control of 3GPP.

For the future, 3GPP plans to further develop LTE-A such that it will be able to fulfill the technical requirements of 5G.

As the 5G system will be based on LTE or LTE-A, respectively, it is assumed that specific requirements of the 5G technologies will, basically, deal with features and methods which are already defined in the LTE and LTE-A standard documentation.

5G technologies will allow a concept of a so called "virtual cell" or "local cell" or the like. In this concept a cell is served by a user equipment ("UE"), e.g. a mobile phone, a computer, tablet, tablet personal computer or the like including a mobile communication interface, or any other device which is able to perform a mobile telecommunication via, for example, LTE(-A), such as a hot spot device with a mobile communication interface. In short, the UE works dynamically as an intermediate node for establishing an indirect network connection between other UEs in the vicinity of the virtual cell or local cell and the network, and/or as an intermediate node between UEs. A function of the intermediate node on the UE may also be carried out by "virtualization". A virtual cell or local cell may communicate with UEs in unlicensed, shared licensed or licensed bands, and it backhauls to the network preferably in licensed bands.

A logical separation between control plane and user plane has been made in accordance with introduction of the IP Multimedia System (IMS) for LTE, and a physical separation between control plane and user plane has been proposed as a possible solution for 5G. Since requirements for the control plane should be basically robustness and wide coverage so as to maintain the service continuity, a macro or anchor base station should provide a link to the control plane. On the other hand a key performance of the user plane is the efficient spectrum usage in order to improve the cell capacity. However, since the requirements of the user plane are highly depending on specific use case or UE capability/category, a variety of types of reception/transmission or routing methods are considered according to the respective use case or UE capability/category taking into account a concept for 5G such as "network slicing".

For the 5G technologies, it is envisaged that a UE in the function as a virtual cell should be able to take over responsibilities, which are typically carried out, for example, in a base station, or eNodeB (Evolved Node B) as it is referred to in LTE (the eNodeB is the element in the evolved UTRA of LTE, the UTRA being the UMTS Terrestrial Radio Access). Such responsibilities which are envisaged to be performed in the UE as a virtual cell, are, for example, radio resource management, radio resource control ("RRC"), connection control, etc. Hence, it is not solely relied on the eNodeB or a small cell to relay data and to organize the local network, but such functions are shifted to the UE functioning as a virtual cell.

Moreover, due to the employment of smaller cells, such as a virtual cell, local cell, distributed unit, intermediate node and the like, the next generation network, e.g. 5G, may become heterogeneous, since it may include cells with different output power, coverage, operating band, RAT (Radio Access Technology) or the like. Thereby, a flexible cell deployment, which may even be dynamic, may be realized in order to adjust a suitable cell capacity to a dynamically demanded traffic. Generally, it is assumed that the cell capacity may be improved by providing small cells in a high dense manner, wherein such small cells may be, for example, hot spots.

Although there exist techniques for addressing the issue of the mobility of a user equipment in the case of a heterogeneous network, it is generally desirable to improve processes in case of mobility of a user equipment in a heterogeneous network.

SUMMARY

According to a first aspect, the disclosure provides a mobile telecommunications system method, comprising obtaining neighboring cell list information indicating neighboring cells; obtaining classification information of cells included in the neighboring cell list information; obtaining a mobility state of a user equipment; and selecting at least one candidate cell to be measured based on the neighboring cell list information, the classification information and the mobility state of the user equipment.

According to a second aspect, the disclosure provides a mobile telecommunications system method, comprising estimating a mobility state of a user equipment; determining, based on the mobility state of the user equipment, whether a reference signal of the user equipment is transmitted; and setting a beam-forming for a transmission signal to the user equipment, based on a measurement result of the reference signal from the user equipment.

According to a third aspect, the disclosure provides a user equipment for a mobile telecommunications system, the user equipment comprising circuitry being configured to receive neighboring cell list information indicating neighboring cells; transmit classification information of cells included in the neighboring cell list information; obtain a mobility state; and selecting at least one candidate cell to be measured based on the neighboring cell list information, the classification information and the mobility state.

According to a fourth aspect, the disclosure provides a user equipment for a mobile telecommunications system, the user equipment comprising circuitry being configured to estimate a mobility state; and determine, based on the mobility state of the user equipment, whether a reference signal of the user equipment is transmitted, wherein a beam-forming for a transmission signal to the user equipment is set, based on a measurement result of the reference signal from the user equipment.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
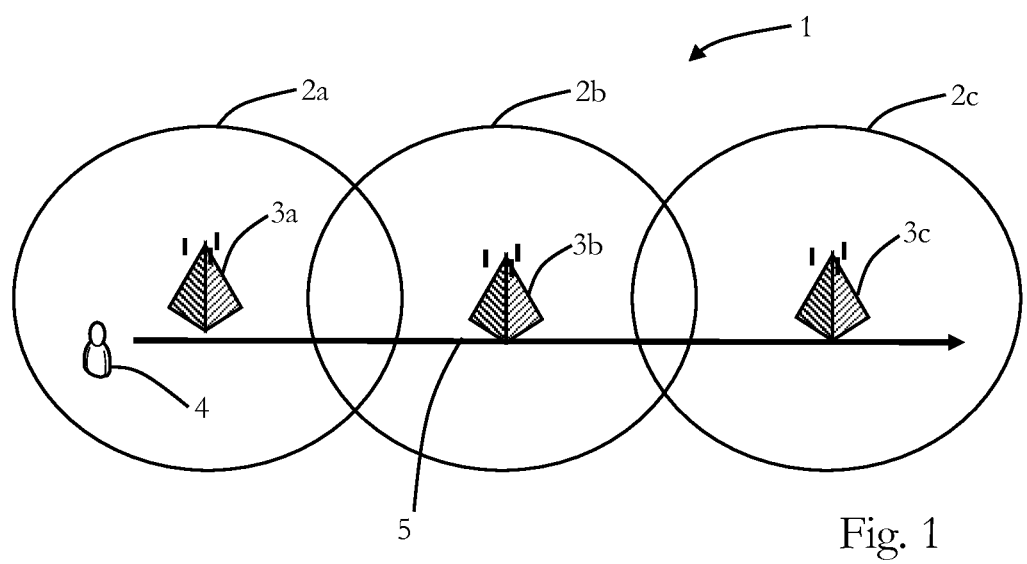
FIG. 1 illustrates several cells of a radio access network, wherein the cells have a similar size and a user equipment travels along the cells.

Before presenting a detailed description of the embodiments under reference of FIG. 1, general explanations are made.

As mentioned in the outset, several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

The candidate for providing the requirements of 5G is the so called Long Term Evolution ("LTE"), which is a wireless communication technology allowing high-speed data communications for mobile phones and data terminals and which is already used for 4G mobile telecommunications systems.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies.

LTE is standardized under the control of 3GPP ("3rd Generation Partnership Project") and there exists a successor LTE-A (LTE Advanced) allowing higher data rates than the basic LTE and which is also standardized under the control of 3GPP.

For the future, 3GPP plans to further develop LTE-A such that it will be able to fulfill the technical requirements of 5G.

As the 5G system will be based on LTE or LTE-A, respectively, it is assumed that specific requirements of the 5G technologies will, basically, deal with features and methods which are already defined in the LTE and LTE-A standard documentation.

5G technologies will allow a concept of a so called "virtual cell" or "local cell", "distributed unit" or the like. In this concept a cell is served by a user equipment ("UE"), e.g. a mobile phone, a computer, tablet, tablet personal computer or the like including a mobile communication interface, or any other device which is able to perform a mobile telecommunication via, for example, LTE(-A), such as a hot spot device with a mobile communication interface. In short, the UE works dynamically as an intermediate node for establishing an indirect network connection between other UEs in the vicinity of the virtual cell or local cell and the network, and/or as an intermediate node between UEs. A function of the intermediate node on the UE may also be carried out by "virtualization". A virtual cell or local cell may communicate with UEs in unlicensed, shared licensed or licensed bands, and it backhauls to the network preferably in licensed bands.

A logical separation between control plane and user plane has been made in accordance with introduction of the IP Multimedia System (IMS) for LTE, and a physical separation between control plane and user plane has been proposed as a possible solution for 5G. Since requirements for the control plane should be basically robustness and wide coverage so as to maintain the service continuity, a macro or anchor base station, which can also be a central unit or the like, should provide a link to the control plane. On the other hand a key performance of the user plane is the efficient spectrum usage in order to improve the cell capacity. However, since the requirements of the user plane are highly depending on specific use case or UE capability/category, a variety of types of reception/transmission or routing methods are considered according to the respective use case or UE capability/category taking into account a concept for 5G such as "network slicing".

For the 5G technologies, it is envisaged that a UE in the function as distributed unit, a virtual cell, local cell should be able to take over responsibilities, which are typically carried out, for example, in a base station, or eNodeB (Evolved Node B) as it is referred to in LTE (the eNodeB is the element in the evolved UTRA of LTE, the UTRA being the UMTS Terrestrial Radio Access). Such responsibilities which are envisaged to be performed in the UE as a virtual cell, are, for example, radio resource management, radio resource control ("RRC"), connection control, etc. Hence, it is not solely relied on the eNodeB or a small cell to relay data and to organize the local network, but such functions are shifted to the UE functioning as a virtual cell.

Moreover, due to the employment of smaller cells, such as a virtual cell, intermediate node and the like, the next generation network, e.g. 5G, may become heterogeneous, since it may include cells with different output power, coverage, operating band, RAT (Radio Access Technology) or the like. Thereby, a flexible cell deployment, which may even be dynamic, may be realized in order to adjust a suitable cell capacity to a dynamically demanded traffic. Generally, it is assumed that the cell capacity may be improved by providing small cells in a high dense manner, wherein such small cells may be, for example, hot spots.

According to 3GPP standard document TS36.304—"User Equipment (UE) procedures in idle mode", mobility states such as a normal-mobility, a medium-mobility and a high-mobility state are specified for a UE in idle mode. If the UE is in a high-mobility state or in a medium-mobility state, the UE shall apply the speed dependent scaling rules as defined in "Scaling rules". These "Scaling rules" can be applied to the adjustment of "Qhyst" and "Treselection", which are known cell reselection parameters. Here "Qhyst" is a parameter of the hysteresis value for ranking criteria and "Treselection" is a parameter of the cell reselection timer value. The cell-ranking criterion Rs for serving cell is specified as Rs=Qmeas,s+Qhyst and Rn for neighboring cell is specified as Rn=Qmeas,n+Qoffset (the parameters are defined in T S36.304). As a result of cell reselection performed by the UE based on these Rs and Rn cell-ranking criteria, the UE always camps on the highest ranked cell. Since a scaling factor for "Qhyst" can be configured with values of −6 dB, −4 dB, −2 dB and 0 dB, these scaling factors tend to decrease the value of "Qhyst", in order to make a cell reselection to a neighboring cell easier the higher the mobility of the UE is. Furthermore, since a scaling factor for "Treselection" can be configured with values of 0.25, 0.5, 0.75 and 1.0, these scaling factors tend to decrease the value of "Treselection", in order to make a cell reselection to a neighboring cell easier the higher the mobility of the UE is.

As also mentioned above, the 5G RAT is expected to deploy a flexible network dynamically, for example, depending on the number of UEs, volume of traffic, traffic profile or the like. In addition, a size of neighboring cells may differ from each other and may even change over time. As 5G RAT is expected to handle a variety of "network slicing" depending on applications or services used, each UE may be expected to perform different cell reselection procedures depending on a respective selected "network slicing".

In this sense it was recognized that introduction of only the current scaling factors for "Qhyst" and "Treselection" may be insufficient, in some embodiments, for an efficient cell reselection in an idle mode, in particular in stations where a UE has a variety of different mobility states. Furthermore, although the current mobile telecommunications system standard generally supports a Layer 3 filtering for reducing measurement reporting in a connected mode, this is not always applicable for reducing the measurement, which is performed by the UE itself, depending on the mobility state.

Additionally, it was recognized that one challenge in this high dense small cell environment might be how to mitigate a measurement processing of the UE with a relatively high mobility in, for example, an idle mode and/or in a connected mode. In some embodiments, an unnecessary cell reselection in the idle mode and a handover in connected mode is reduced or avoided.

Hence, some embodiments provide an efficient mobility scheme depending on the mobility of the UE in a flexible configured mobile telecommunications system, e.g. having different sized cells. Some embodiments provide a concept of mobility dependent selection of suitable candidate cells to be measured for cell reselection and measurement reporting.

Consequently, some embodiments pertain to a mobile telecommunications system method, comprising obtaining neighboring cell list information indicating neighboring cells; obtaining classification information of cells included in the neighboring cell list information; obtaining a mobility state of a user equipment; and selecting at least one candidate cell to be measured based on the neighboring cell list information, the classification information and the mobility state of the user equipment.

The mobile telecommunications system may be based on the principles of the LTE technology, as mentioned above. The mobile telecommunications system includes at least one macro cell, anchor cell or central unit (cell), being established e.g. by a base station or anchor base station. The term base station (cell) is to be understood broadly and can be, in principle, any kind of node (cell) or central unit (cell). The mobile telecommunications system may also have at least one slave cell or distributed unit (cell) which is associated with the anchor cell and which is established, for example, by a slave base station. Also the term slave base station or anchor base station has to be understood broadly, such that, for example, distributed units also fall under this terms in some embodiments. The slave cell may be a small cell, local cell, virtual cell or the like, which is established by a slave base station, e.g. an intermediate node or the like, which may be implemented on the basis of a UE. The base station can be based on the known eNodeB of LTE, as one example.

The mobile telecommunications system may include at least one user equipment, which may be, for example, a mobile phone, smartphone, a computer, tablet, tablet personal computer or the like including a mobile communication interface, or any other device which is able to perform a mobile telecommunication via, for example, LTE, such as a hot spot device with a mobile communication interface, etc.

A neighboring cell may be a cell which is located adjacent to or in the neighborhood of a cell in which the user equipment is currently located. The classification information may be indicative of a size of a cell. Furthermore, the classification information may be indicative of a (un-)suitability of the cell for a UE moving with a high speed or being in a specific mobility state. The mobility state may be an indication of a velocity of the user equipment.

In some embodiments, the mobile telecommunications system method further comprises obtaining threshold information including at least one threshold being associated with a mobility state of a user equipment. The threshold may also be indicative of a cell size. Hence, for example, by comparing the classification information with the threshold, specific candidate cells having a size which is large enough can be selected, while smaller cells may be disregarded. The threshold information may be configured based on at least one of identification of network slicing and connection point of at least one entity of a core network.

The at least one candidate cell may be further selected based on the threshold information. In some embodiments, the selection of the at least one candidate cell is based on a comparison between the threshold and the classification information.

The classification information may be indicative of at least one of: a cell size, transmission power of at least one reference signal, suitability of a cell for a user equipment having a certain mobility state and operating frequency band information. For example, a small cell may not be suitable for a user equipment having a high velocity and this can be indicated by the classification information.

The method may further comprise measuring at least one of power level and quality of a reference signal transmitted from the selected at least one candidate cell.

The method may further comprise determining a cell ranking of the selected at least one candidate cell. The cell ranking may be based on the classification information.

The method may further comprise performing a cell reselection based on the cell ranking.

The method may further comprise obtaining configuration information indicating measurement reporting information. The measurement reporting information may include at least one condition for triggering a measurement reporting about the measured selected candidate cell, wherein the condition is based on the mobility state of the user equipment. The method may further comprise setting the condition and trigger measurement reporting in case that the condition is met.

The classification information may include first type classification information and second type classification information. The first type classification may be associated with cells being deployed locally, dynamically or in distributed manner and the second type classification may be associated with stationary macro cells in central manner. An update frequency of the first type classification information may differ from an update frequency of the second type classification information.

The mobile telecommunications system method may further comprise establishing a first connection between a first base station and the user equipment for exchanging signaling data; and establishing a second connection between a second base station and the user equipment for exchanging data; wherein the neighboring cell list information and the classification information are obtained from the first base station over the first connection and wherein the candidate cell is selected for the second connection. Here the neighboring cell list information and the classification information may be provided via SI (System Information) in broadcasting manner, or dedicated signaling in connected mode. The first base station may be an anchor base station and the second base station may be a slave base station. Moreover, the first base station may transmit signaling data over a control plane and the second base station may communicate over a user plane. The candidate cell for the second connection to be measured may be selected based on a comparison between the classification information and the threshold.

Some embodiments pertain to a mobile telecommunications system method, comprising estimating a mobility state of a user equipment; determining, based on the mobility state of the user equipment, whether a reference signal of the user equipment is transmitted; and setting a beam-forming for a transmission signal to the user equipment, based on a measurement result of the reference signal from the user equipment.

The reference signal from the user equipment may be received from at least two antennas of a base station for the measurement of the reference signals.

An angle of the reference signal may be estimated, wherein the beam-forming may be set, based on the angle, such that the transmission signal is directed towards the user equipment. The configuration of beam-forming may include carrying out changing a relative amplitude and/or phase of feeding signals to antennas so that a directivity of antennas is towards the angle of arrival.

A base station for setting the beaming-forming may be selected based on the measurement result. A specific reference signal from the user equipment may be received by one or a plurality of base stations, distributed units or intermediate nodes between the base station and the user equipment for the measurement and a base station, distributed unit or intermediate node may be selected to set the configuration of beam-forming based on results of the measurement of the specific reference signal.

Some embodiments pertain to a user equipment for a mobile telecommunications system, the user equipment comprising circuitry being configured to receive neighboring cell list information indicating neighboring cells; transmit classification information of cells included in the neighboring cell list information; obtain a mobility state; and select at least one candidate cell to be measured based on the neighboring cell list information, the classification information and the mobility state, as discussed above and the description made with respect to the method applies mutatis mutandis to the user equipment. The circuitry may be further configured to obtain threshold information including at least one threshold being associated with a mobility state of the user equipment. The at least one candidate cell may be further selected based on the threshold information. The classification information may be indicative of at least one of: a cell size, transmission power of at least one reference signal, and operating frequency band information. The circuitry may be further configured to measure at least one of power level and quality of a reference signal transmitted from the selected at least one candidate cell. The circuitry may be further configured to determining a cell ranking of the selected at least one candidate cell. The circuitry may be further configured to performing a cell reselection based on the cell ranking. The circuitry may be further configured to obtain configuration information indicating measurement reporting information. The measurement reporting information includes at least one condition for triggering a measurement reporting about the measured selected candidate cell, wherein the condition is based on the mobility state of the user equipment. The circuitry may be further configured to set the condition and trigger measurement reporting in case that the condition is met. The classification information may include first type classification information and second type classification information. An update frequency of the first type classification information may differ from an update frequency of the second type classification information. The first type classification may be associated with cells being deployed locally, dynamically or in distributed manner. The second type classification may be associated with stationary macro cells in central manner. The circuitry may be further configured to establish a first connection between a first base station and the user equipment for exchanging signaling data; and to establish a second connection between a second base station and the user equipment for exchanging data; wherein the neighboring cell list information and the classification information are obtained from the first base station over the first connection and wherein the candidate cell is selected for the second connection. Here the neighboring cell list information and the classification information may be provided via SI (System Information) in broadcasting manner, or dedicated signaling in connected mode. The threshold information may be configured based on at least one of identification of network slicing and connection point of at least one entity of a core network.

Some embodiments pertain to a user equipment for a mobile telecommunications system, the user equipment comprising circuitry being configured to estimate a mobility state; and determine, based on the mobility state of the user equipment, whether a reference signal of the user equipment is transmitted, wherein a beam-forming for a transmission signal to the user equipment is set, based on a measurement result of the reference signal from the user equipment, as discussed above. The reference signal from the user equipment may be received from at least two antennas of a base station for the measurement of the reference signals. An angle of the reference signal may be estimated and the beam-forming may be set, based on the angle, such that the transmission signal is directed towards the user equipment. A base station for setting the beaming-forming may be selected based on the measurement result.

As shown above, in some embodiments, measurement overhead is optimized for a speed dependent cell reselection in idle mode and a handover in connected mode is optimized for a flexible network deployment in next generation such as 5G. In some embodiments, the cells to measure may be determined based on the cell size and speed estimation.

Returning to FIG. 1, there is illustrated a RAN 1 (Radio Access Network), wherein in this case three macro cells 2a to 2c are illustrated which are served and established by respective base stations 3a, 3b and 3c, respectively. The base stations 3a, 3b and 3c are basically an eNodeB type base station. A UE 4 travels along a path 5 with a given velocity from cell 2a, over cell 2b to cell 2c, etc.

As discussed above, basically, an allowable duration for cell reselection (Treselection discussed above) could be shorter depending on higher mobility. In order to realize a smooth cell reselection performed by a UE in idle mode depending on mobility, mobility states such as a normal-mobility state, a medium-mobility state and a high-mobility state and respective speed dependent scaling rules for the cell-reselection criterion were introduced in TS36.304—"User Equipment (UE) procedures in idle mode", discussed above. The Treselection (cell reselection timer) and Qhyst (hysteresis applied to cell ranking criteria) parameters are scaled according to the mobility state, mentioned in paragraph 5.2.4.3.1. of TS36.304 and they were also discussed above. As taken into account relatively same size of cells as exemplary shown in FIG. 1, the current speed dependent scaling rules for the cell-reselection criterion is expected to work on cell reselection efficiently in some embodiments.

Figure 2:
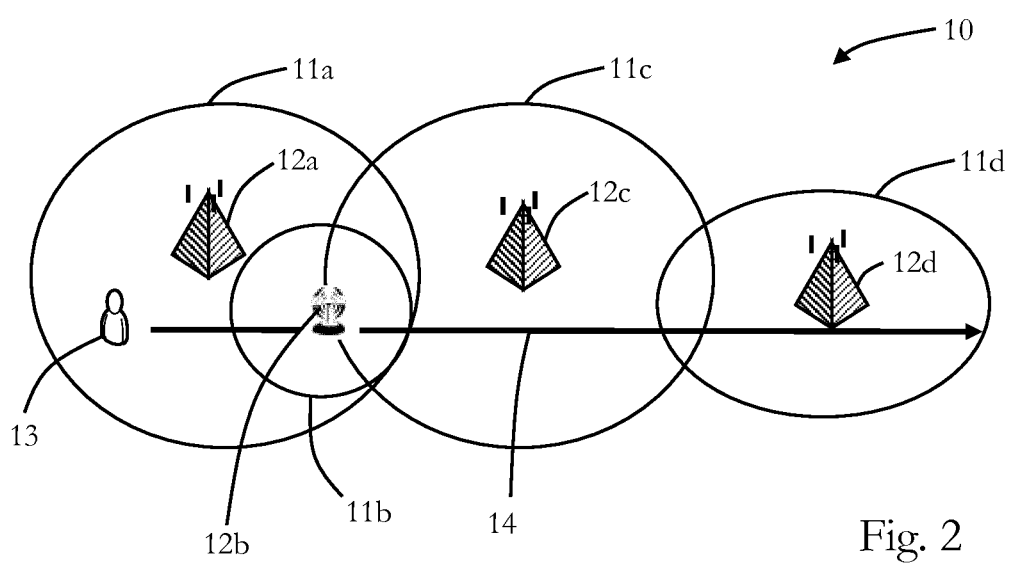
FIG. 2 illustrates several cells of a radio access network, wherein the cells have different sizes and a user equipment travels along the cells.

On the other hand, FIG. 2 illustrates an embodiment of a RAN 10 as it might appear in 5G and which has a variety of different types of base stations and cells, namely a macro cell 11 having an eNodeB base station 12a, a small or virtual or local cell 11b which is served, for example, by a hot spot 12b (or a UE or the like), a further macro cell 11c served by an eNodeB base station 12c and a smaller macro cell 11d served by a further base station 12d. A UE 13 travels along a path 14 crossing all cells 11a to 11d. The deployment of each of the base stations 12a to 12d may be dynamic.

Figure 3:
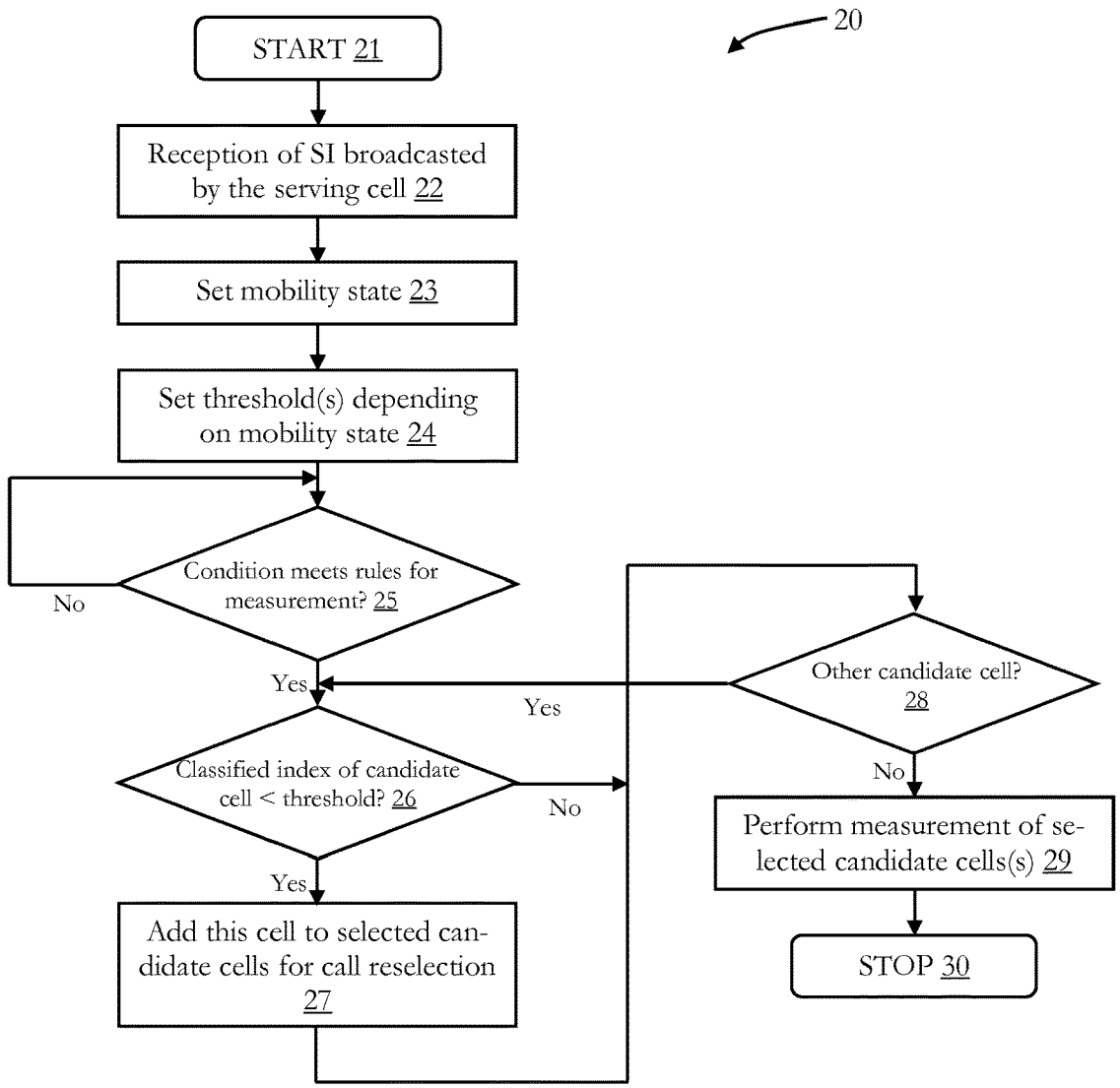
FIG. 3 illustrates a flow chart of a method for performing a cell measurement, based on a mobility state of a user equipment.

FIG. 3 illustrates a mobile telecommunications systems method 20 for performing a measurement in dependence of a mobility state, in order to realize an efficient speed dependent cell reselection. As discussed above, as the UE having a higher mobility state will be for a shorter time within the coverage of a cell with smaller cell size, e.g. cell 11b in FIG. 2, than within a cell with a larger cell size, e.g. cell 11a in FIG. 2, in some embodiments, the UE does not monitor all candidate cells regardless of cell size, mobility state and so on, since even if the speed dependent scaling factor discussed above is applied to the cell-reselection criteria, this may be inefficient. Hence, in the embodiment of FIG. 3, the UE with higher mobility state will select suitable candidate cells with relatively wider cell size, as will be discussed in the following.

At 21, the method starts and at 22 system information "SI" is received, which is broadcasted by a serving cell or serving base station, e.g. cell 11a or base station 12a in FIG. 2 to UE 13 located in cell 11a. The system information SI includes neighboring cell list information which indicates neighboring cells, i.e. cells which are in the neighborhood of the cell in which, for example, the UE is located. Referring to FIG. 2, assuming that UE 13 is located in cell 11a, such neighboring cell list information indicates neighboring cells 11b and 11c.

Moreover, the system information includes classification information, which is implemented as a classified index in the present embodiment. The classified index includes information which indicates the size of a cell or is representative of the size of the cell, such as transmission power of some specified reference signals, operating frequency band or the like. The classified index is provided for each of the neighboring cells indicated in the neighboring cell list information. For example, there is provided a first classified index for cell 11b and a second classified index for cell 11c. As cell 11b is much smaller than cell 11c in FIG. 2, the classified index for 11b is larger than the classified index for 11c and, thereby, indicates the size of the respective cell.

Moreover, the system information includes parameters which indicate mobility states as it is known for example from TS 36.304, and at 23, based on these parameters received, a respective mobility state is set, which can be, as also defined in TS 36.304, a normal-, medium- or high-mobility state without limiting the present disclosure in that regard. Such parameters may be Sintrasearch, SintrasearchP, SintrasearchQ, Snonintrasearch, SnonintrasearchP, SnonintrasearchQ, etc. which are used as parameters for cell reselection measurement rules in LTE.

At 24, a threshold is set, which depends on the mobility state, i.e. there is a predefined number of thresholds such that at least for each mobility state a respective thresholds is set. For example, there is provided a first threshold for the normal-mobility state, a second threshold for the medium-mobility-state and a third threshold for the high-mobility state. Hence, depending on the mobility state which is set at 23, a respective associated threshold is set at 24. The thresholds may be predefined or they can be transmitted, for example, from a base station to a user equipment, for instance, in the system information or the system information includes parameters or the like on the basis of which the respective thresholds can be determined.

The thresholds can be set, for example, for a transmission power and/or frequency band depending on the mobility state or the like. Generally, the thresholds indicate a threshold to which the classified index can be compared.

Hence, if the classified index is indicative of a transmission power, the threshold can also be an indication of a transmission power, and if the classified index is indicative of a frequency band, also the threshold can be indicative of a frequency band, etc.

At 25 it is generally checked, whether the known rules (see above) for measurement of a cell in cell reselection are met at the present condition, and if the result is "Yes", the method proceeds to 26. If the result is "No" the method can, for example, periodically repeat the check at 25 until the result is "Yes".

At 26, the classified index for each of the neighboring cells indicated in the neighboring cell list information, which thereby form a set of candidate cells, is compared to the threshold set for the current mobility state at 24.

In the present embodiment, the thresholds and the classified index are represented by numbers, wherein the ranking is made in a way that lower numbers represent larger cell sizes (e.g. larger transmission power, frequency band, etc.) and higher numbers represent smaller cell sizes (of course, the present disclosure is not limited in that regard).

For example, it is assumed that the classified index has a range between 0 and 4, wherein 0 represents the largest cell and 4 the smallest, cells 11a and 11c may have a classified index of "0", the smaller cell 11d may have a classified index of "1" and the small cell 11b may have a classified index of "3" (there may be smaller cells, e.g. served by a UE which may have a classified index of "4").

Moreover, it is assumed that the threshold is set to "2" at 24, since at 23 the mobility state is set to the high-mobility state (e.g. a medium-mobility state may be associated with a threshold of "3", a normal-mobility state may be associated with "4" and, for example, a static state may be associated with a threshold of "5").

Hence, at 26, if for the first candidate cell, for example, cell 11b, the classified index "3" in this example is compared to the threshold of "2", the result at 26 is that this candidate cell 11b does not have a classified index which is below the threshold, but above. Hence, the result at 26 is "No", which results in a further check at 28, whether a further candidate cell is available. Assuming that the further candidate cell is cell 11c in the present example, the method 20 goes back to the check at 26 and checks whether the classified index of "0" of the cell 11c is smaller than the threshold of "2", which results in the answer of "Yes" in the present example.

Then at 27 this cell, i.e. 11c, is selected as a candidate cell for call reselection and at 28 it is checked once more, whether a further candidate cell is available. In the present example, the result of the check at 28 is "No" and, thus, at 29 the measurement of the selected candidate cell(s) is performed (and then respective cell reselection is performed). At 30 the method ends.

Hence, according to method 20, an unnecessary cell reselection for a UE with e.g. a high-mobility state in a cell operating at a higher frequency, e.g. millimeter wave, which generally has a smaller cell size in view of the associated propagation characteristic and for which generally only a short visit for the UE in high-mobility state will occur, and the respective measurement of such a cell can be avoided.

Figure 4:
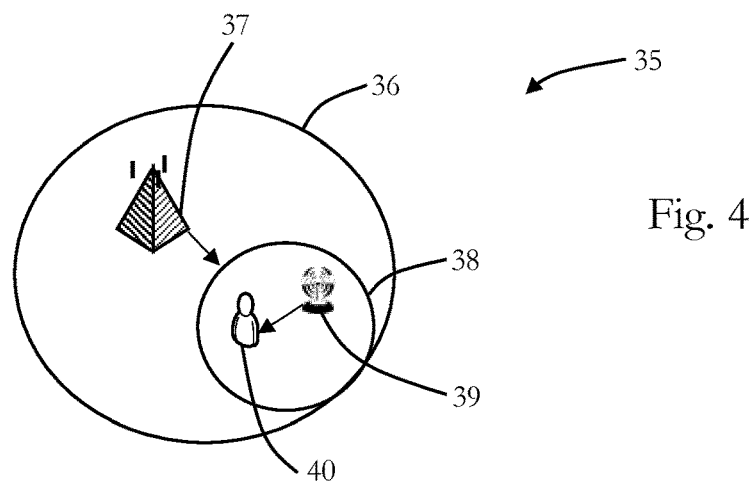
FIG. 4 illustrates a radio access network with a control plane cell and a user plane cell.

In the embodiment of FIG. 4 a RAN 35 is illustrated employing a control plane and a user plane. A base station 37 is configured as an eNodeB and functions as an anchor base station or central unit serving an anchor cell 36. The anchor cell 36 together with the anchor base station 37 provide the control plane (the anchor cell 36 can also be referred to as "control plane cell"). A virtual cell or local cell 38 is served by a hot spot 39 (or a UE), wherein the virtual cell or local cell 38 is a slave cell and the hot spot 39 is a slave base station or distributed cell providing the user plane. Thus, the virtual cell or local cell 38 can also be referred to as "user plane cell". A UE 40 is illustrated to be present in the control plane cell 36 and the user plane cell 38.

Due to the separation into user plane and control plane, the UE 40 gets the information mentioned in the discussion above in connection with FIG. 3, e.g. the SI with neighboring cell list information, classification information, thresholds, etc. from the anchor cell 36 (control plane cell). The system information broadcasted by the anchor cell 36 includes all the relevant information of its slave cells, e.g. slave cell 38. When the UE 40 enters the coverage of the slave cell 38 after getting the cell id of the slave cell, it will correlate the corresponding assistant information with this specific cell 38. Here, a reselection of the user plane cell may be performed in the mobility dependent manner as described under reference of FIG. 3 and a reselection of the control plane cell may also be performed in the mobility dependent manner as described under reference of FIG. 3.

In some embodiments, event-triggered reporting is used for the measurement for an E-UTRAN (UMTS Terrestrial Radio Access Network) controlled handover in LTE, which is different from the UE controlled cell reselection in idle mode discussed above. Although a decision of necessity of handover is performed by the E-UTRAN (i.e. network), the necessary measurement for such a handover is basically performed by a UE based on rules configured by the E-UTRAN, such as event-triggered reporting or the like. Hence, in some embodiments, for triggering an efficient measurement, the same type of scheme as discussed above under reference of FIG. 3 can be applied to the procedure of handover in the connected mode.

One important role of a UE in a handover procedure should be a reporting measurement to a network, e.g. to a base station. The network (e.g. the base station) can decide whether the UE needs to perform the handover from the current serving cell to a target cell or not, based on a measurement reported by the UE. Hence, in some embodiments, the above efficient scheme of measurement for cell reselection considering the mobility state in an idle mode of the UE is applied to a measurement reporting for a handover in a connected mode of the UE. The current measurement reporting for handover is basically triggered depending on events configured via SI and the dedicated signaling such as a RRC connection Setup, a RRC Connection Reconfiguration and a RRC Connection Re-establishment message transmitted by the network (e.g. base station).

For example, the 3GPP document TS36.331: "Radio Resource Control (RRC); Protocol specification" specified six intra-system measurement reporting events such as A1, A2, A3, A4, A5 and A6 and 2 inter-system measurement reporting events such as B1 and B2.

For example Event A1 is specified as follows (see section 5.5.4.2 "Event A1 (Serving becomes better than threshold of TS36.331 (see e.g. Rel. 13)):

5.5.4.2 Event A1 (Serving becomes better than threshold)
The UE shall:
1> consider the entering condition for this event to be satisfied when condition A1-1, as specified below, is fulfilled;
1> consider the leaving condition for this event to be satisfied when condition A1-2, as specified below, is fulfilled;
1> for this measurement, consider the primary or secondary cell that is configured on the frequency indicated in the associated measObjectEUTRA to be the serving cell;
Inequality A1-1 (Entering condition)
$Ms - Hys > Thresh$
Inequality A1-2 (Leaving condition)
$Ms + Hys < Thresh$
The variables in the formula are defined as follows:
Ms is the measurement result of the serving cell, not taking into account any offsets.
Hp is the hysteresis parameter for this event (i.e. hysteresis as defined within reportConfigEUTRA for this event).

Thresh is the threshold parameter for this event (i.e. a1-Threshold as defined within reportConfigEUTRA for this event).

Ms is expressed in dBm in case of RSRP, or in dB in case of RSRQ and RS-SINR.

Hp is expressed in dB.

Thresh is expressed in the same unit as Ms.

In the connected mode, in some embodiments, the parameter "Hys" can be configured or adjusted with some values according to speed dependent scaling rules based on a mobility state of a UE similar to the "Qhyst" of the cell-ranking criterion Rs discussed above. For the parameter "Hys", the parameter "Thresh" can be configured or adjusted with some values according to the speed dependent scaling rules based on mobility state. Furthermore, this approach can be applied to other events of the measurement reporting.

The UE in connected mode is typically configured with measurement reporting via the RRC connection Setup, the RRC Connection Reconfiguration and the RRC Connection Re-establishment messages transmitted by the network (e.g. base station). The configuration of a measurement is defined by "Measurement Objects", "Reporting Configurations", "Measurement Identities", "Quantity Configurations", "Measurement Gaps" and so on, as generally known. The "Measurement Objects" specifies the following objects: intra-frequency object, inter-frequency object, inter-RAT EUTRAN, inter-RAT UTRAN object, etc. Here, for example, intra-frequency and inter-frequency measurement can specify individual cells to be measured (i.e. as a whitelist) and individual cells to be excluded from measurements (i.e. as a blacklist), and these individual cells are referenced by their Physical layer Cell Identities (PCI), such that this information is a neighboring cell list information. "Reporting Configurations" can specify the triggering mechanism for reporting measurement in event driven or periodic manner.

An embodiment which is based on the above given procedures for the connected mode of the UE is discussed in the following under reference of FIG. 5.

Figure 5:
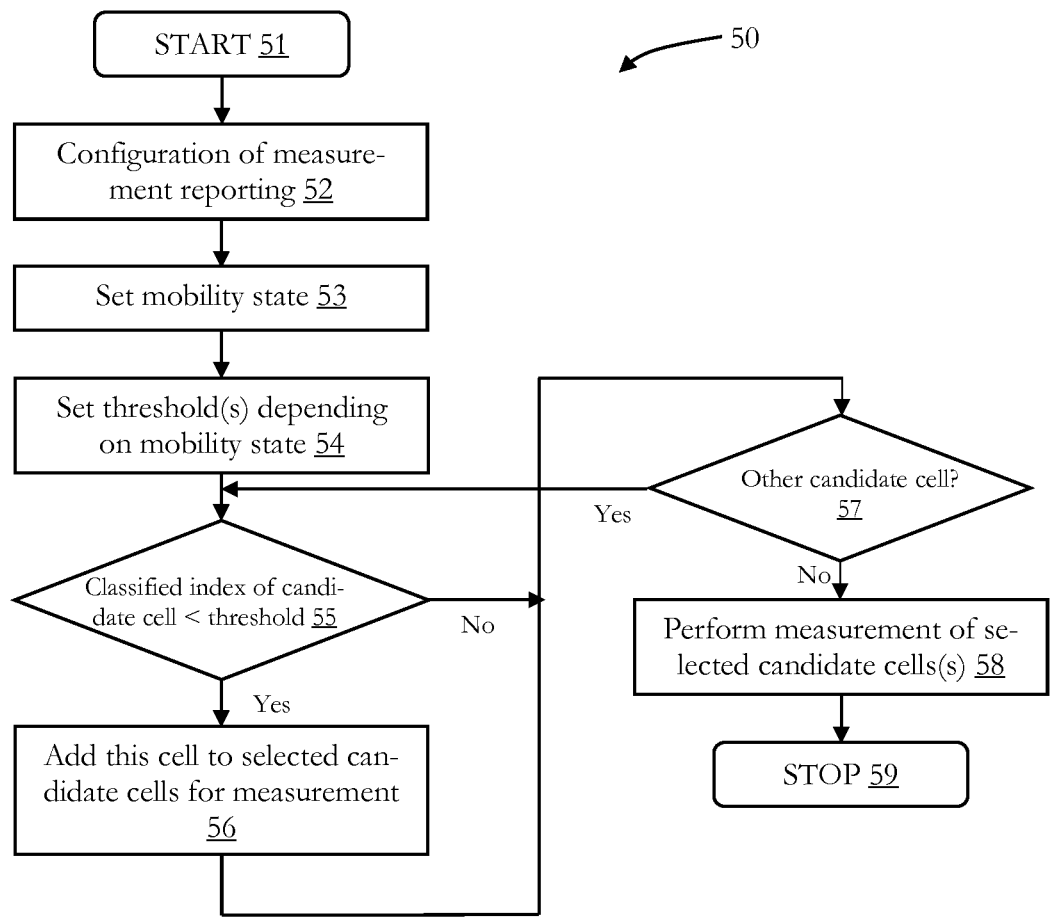
FIG. 5 illustrates a flow chart of a method for performing a cell measurement, based on a mobility state of a user equipment.

FIG. 5 illustrates a flowchart of a method 50 for selecting a candidate cell for measurement utilizing the classified index indicating a cell size depending on a mobility state of a UE. The classified index may have the properties as discussed above, in particular, under reference of FIG. 3.

This method 50 starts at 51 and at 52 the UE is configured with a measurement reporting and at 52 a respective mobility state is set for the UE, as it has also already been discussed in detail under reference of FIG. 3.

To select one (ore more) candidate cell(s) among cells which are specified by "Measurement Objects" depending on the mobility state of the UE, a threshold is set depending on the mobility state at 54, as it has also been discussed above under reference of FIG. 3.

Subsequently at 55, the UE determines whether a classified index of a candidate cell is smaller than the threshold which has been set in accordance with the mobility state at 54. Here, as also discussed above under reference of FIG. 3, the classified index is based on a cell size and it may take into account transmission power, operating frequency band or the like as discussed above and the classified index is larger for a smaller cell size, for example, in a way as discussed under reference of FIG. 3. In other words, at 55, a candidate cell can be selected as a selected candidate cell for measurement depending on its cell size and the mobility state of the UE.

The candidate cell for which the classified index was determined as being smaller than the threshold at 55 ("Yes") is added to a set of selected candidate cells for measurement at 56. If the classified index for the candidate cell under the check of 55 is larger than the threshold ("No"), the method 50 checks at 57 whether another candidate cell is present. If this is the case ("Yes"), the method goes back to 55 and checks for the next candidate cell whether its classified index is above or below the threshold.

Otherwise ("No") the UE performs the measurement of the selected candidate cell(s) at 58 and the method stops at 59.

In this embodiment, the selected candidate cell(s) can be treated as the suitable candidate cell(s) for measurement depending on mobility state. Hence, according to the method 50, an unnecessary cell handover for a UE with e.g. a high-mobility state in a cell operating at a higher frequency, e.g. millimeter wave, which generally has a smaller cell size in view of the associated propagation characteristic and for which generally only a short visit for the UE in high-mobility state will occur, and the respective measurement of such a cell can be avoided.

According to method 50 of FIG. 5, the UE performs the selection of the candidate cell(s) for measurement based on its mobility state. In embodiments, wherein the network (e.g. base station) handles the mobility state of the UE, the method 50 of FIG. 5 may be performed by the network, e.g. the base station (e.g. eNodeB). In this scenario the network, e.g. the base station, can configure the UE measurement reporting and the "Measurement Objects" specifies the above selected candidate cells depending on mobility state as individual cells to be measured.

Figure 6:
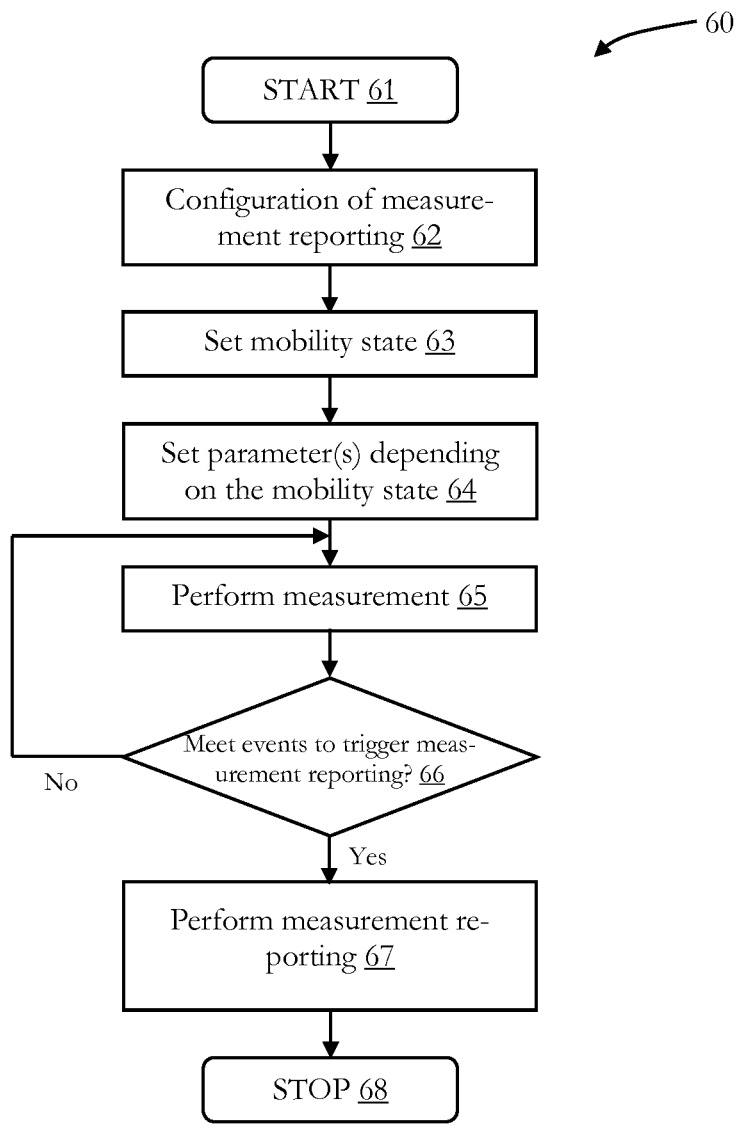
FIG. 6 illustrates a flow chart of a method for performing a measurement reporting, based on a mobility state of a user equipment.

An embodiment of a method 60 for providing a handover depending on a mobility state of the UE is illustrated in FIG. 6.

When the UE is in the connected mode, the method starts at 61 and the UE is configured with measurement reporting at 62 and the mobility state is set at 63, as discussed also under reference of FIGS. 3 and 5.

One or more parameters configured by "Reporting Configurations" are set depending on the mobility state of the UE at 64. As mentioned above, "Reporting Configurations" can specify the triggering mechanism for reporting measurement in event driven or periodic manner The UE performs measurements according to the above discussed "Measurement Objects" at 65. Then the UE determines whether the condition meets events to trigger measurement reporting depending on mobility state or not at 66.

For example, in Event A1 discussed above, the entering condition is defined as Ms−Hys>Thresh. In short, the UE can be configured with the different Hys or/and Thresh depending on the mobility state of the UE, such that an UE having a higher mobility state can trigger measurement reporting earlier than a UE having a lower mobility state. If the UE determines at 66 to enter a condition of some events ("Yes"), the UE starts at 67 measurement reporting according to the configurations set at 62. Otherwise ("No"), the method 60 returns back to 65.

Above, it was assumed that the UE sets the parameters at 64. However, in other embodiments, the network, e.g. base station (e.g. eNodeB) may configure the UE "Reporting Configuration" which has different parameters such as Hys, Thresh and so on depending on mobility state at 62. Hence, in such embodiments, setting the parameters at 64 may be omitted.

As an alternative, in the case that the UE is in a light connected mode in which some requirements of a full connected mode are omitted and/or communication may be reduced, the speed dependent cell reselection as discussed under reference of FIGS. 3 and 4 can be adopted for selecting the access cell during movement of the UE. Additionally, a threshold speed may be used to determine whether to switch an RRC state and to employ the mobility based handover and/or cell reselection discussed above. For example, in some embodiments, it is determined to employ the cell reselection discussed under reference of FIG. 3 at higher speeds which are above a certain threshold. Similarly, it can be determined whether the mobility dependent measurement of the embodiment of FIG. 5 and/or the handover of FIG. 6 is used, based on speed.

Also required performance of radio (i.e. modulation scheme, required SNR or the like) may change depending on services according to "network slicing" which may be categorized by some sort of ID, such as service ID or IP address allocated to each entity of a core network corresponding to slicing or the like. Then, in some embodiments, the selected candidate cells for measurement may be further depending on those IDs or IP addresses.

Above, embodiments pertaining to mobility dependent cell selection/reselection and handover depending on cell size were described.

In the following, embodiments pertaining to a collocation of dynamically deployed cells, such as a virtual cell, local cell, mobile relay or the like are discussed.

The network, e.g. the base station (e.g. eNodeB) has to update information of neighboring cells including dynamically deployed cells, such as virtual cell and the like. Hence, information about neighboring cells which is included the in system information has to be updated depending on dynamically deployed cells for the UE being in an idle state. Similarly, information of neighboring cells which is signaled for RRC connection Setup, the RRC Connection Reconfiguration and the RRC Connection Re-establishment messages, has to be updated for the UE in connected mode. If all UEs in idle mode have to update their system information frequently, an overhead could be caused to some extent.

In the case of a UE having a higher mobility state, in some embodiments, there is not always a need to update a part of the neighboring cell list information which pertains to the dynamically deployed cells and, thus, in some embodiments, the information of the part of dynamically deployed cells in of the neighboring cell list information may be updated separately from the other part of the neighboring cell list information pertaining to other neighboring cells, e.g. static or macro cells or other cells which are not dynamically deployed.

Hence, in some embodiments, the network, e.g. base station (e.g. eNodeB) can update information of the part of the neighboring cell list information pertaining to the dynamically deployed cells with a first updating frequency which differs from a second updating frequency with which information pertaining to the other neighboring cells is updated.

Figure 7:
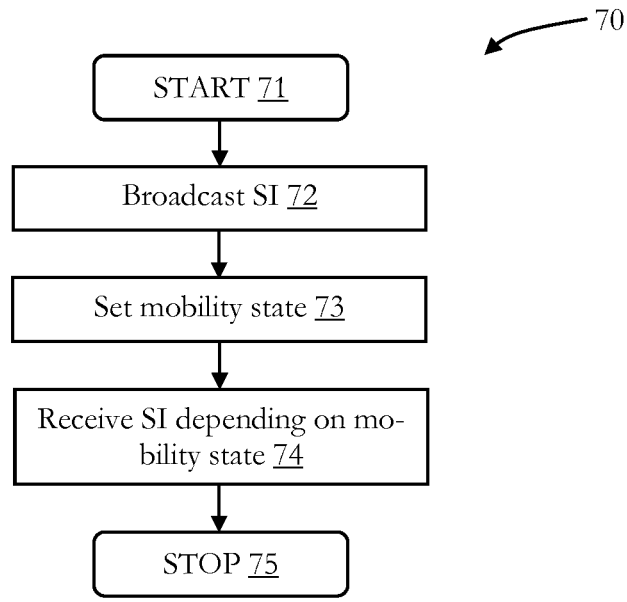
FIG. 7 illustrates a flow chart of a method where system information is received, based on a mobility state of a user equipment.

A respective method 70 is illustrated in FIG. 7, which starts at 71 and broadcasts the SI 72 accordingly, i.e. information of the neighboring cell list information pertaining to the dynamically deployed cells is broadcasted with a first updating frequency and information pertaining to the other neighboring cells is broadcasted with a second updating frequency.

The UE can update the information of the part of dynamically deployed cells and/or of other neighboring cells in correspondence with the mobility state of the UE, which is set at 73, for example, in a way as discussed above under reference of FIG. 3.

In the embodiment of FIG. 7 the system information broadcasted by an anchor cell indicates, whether a slave cell in the coverage of the anchor cell is a "dynamically deployed cell" or not.

Then, at 74, depending on its mobility state, the UE decides whether to receive the updated system information of the slave cell or not and the method 70 stops at 75.

Furthermore, if all UEs in connected mode have to update configurations of measurement reporting depending on dynamically deployed cells, overhead of dedicated signaling for that might be an issue. Therefore, in some embodiments, in such a case the network (e.g. base station) can determine depending on the mobility state of the UE, whether information including the part of dynamically deployed cells should be sent or not.

In the following, embodiments pertaining to beam based mobility planned in future 5G systems are discussed.

In 5G a Transmission/Reception Point (TRP) or relay node will be equipped with an antenna array, such that a download signal can be provided to a UE having a beam-formed shape for improving a signal-to-noise ratio (SNR). Here the Transmission/Reception Point (TRP) or relay node acts as distributed unit.

For configuring the beam-forming, at least a measurement for estimating an Angle of Arrival (AoA) is performed in some embodiments.

The UE in connected mode transmits UE specific reference signals using pre-determined or configured radio resources, such as a sounding reference signal or the like, which are configured by the system information or dedicated signaling received from the eNodeB. The transmission power of the UE specific reference signals is also pre-determined or configured by a network, e.g. the eNodeB.

Each TRP will monitor the pre-determined or configured radio resources for measurement purposes. The eNodeB will configure the setup of TRP based on a respective measurement. For example, the TRP can be selected depending on the strength of the received reference signal and the setup of beam-forming can be configured depending on an AoA estimation, which is based on strength, relative delay or the like of the reference signal measured by each antenna element of the antenna array.

In some embodiments, the utilization of beam-forming might be limited to UEs having a relatively low mobility state, because, in some embodiments, it is difficult for the network to track a UE having a high mobility state for beam-forming. Hence, in some embodiments, the UE controls whether it transmits UE specific reference signals for beam-forming or not depending on its mobility state, as taking into account efficient usage of radio resources, power consumption of the UE or the like. In addition, the UE may control transmission of a specific reference signal which indicates the extent of beam-forming depending on its mobility state. The extent of beam-forming may include how many antennas or antenna elements of the antenna array are required, how a width of a main beam should be, etc. In some embodiments, it could be difficult for a UE having a higher mobility state to handle a narrow beam, and, thus, a wider beam would be preferable. Moreover, the network may also configure the setup of beam-forming based on the mobility state of a UE and it could also configure the estimation of AoA, based on the mobility state of the UE.

Figure 8:
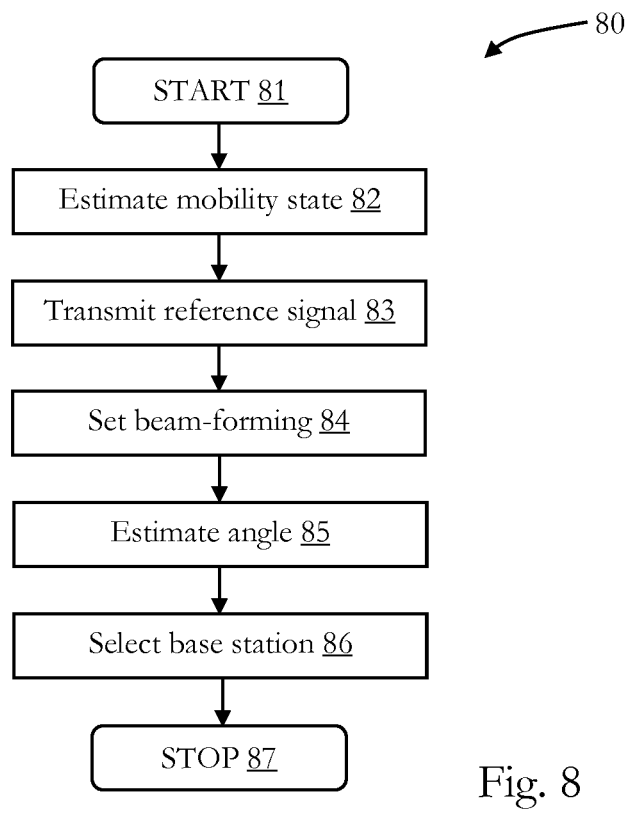
FIG. 8 illustrates a flow chart for beam-forming, based on a mobility state of a user equipment.

In the following, a method 80 for performing beam-forming is discussed under reference of FIG. 8.

The method starts at 81 and at 82 a mobility state of a UE is estimated, e.g. as discussed above, in particular under reference of FIG. 3.

At 83, based on the mobility state of the UE, it is determined, whether a reference signal of the UE is transmitted.

At 84, a beam-forming for a transmission signal to the UE is set, based on a measurement result of the reference signal from the UE.

As discussed above, the reference signal from the UE may be received from at least two antennas of a base station for the measurement of the reference signals.

At 85, an angle of the reference signal is estimated, wherein the beam-forming is set, based on the angle, such that the transmission signal is directed towards the user equipment.

At 86, a base station for setting the beaming-forming is selected based on the measurement result and the method 80 ends at 87.

In LTE and UMTS, currently the UE mobility state is estimated based on the number of cell reselections. In some embodiments, the UE counts cell reselections only for macro cells and does not count cell changes within small cells.

In some embodiments, beam-forming is employed, which can potentially be used to provide an accurate determination of position, and hence an improved mobility state estimation based on beam-forming location estimation.

Of course, other methods of speed estimation may also be employed and used in the present disclosure.

Some of the embodiments discussed herein, focus on an efficient measurement for cell reselection in an idle mode of the UE and a measurement reporting in connected mode of the UE. By taking into account a variety type of cells (i.e. transmit power, operating frequency, use cases such as indoor or outdoor or the like) in the next generation RAT, a special care for reducing overhead of measurement under heterogeneous network environment might be necessary, which is addressed in some embodiments. Consequently, some embodiments reduce an overhead of measurement for cell reselection in idle mode and a measurement reporting in connected mode by selecting suitable candidate cells to be measured depending on the mobility state of the UE. According to some embodiments, since the UE having a higher mobility state does not have the need to measure such an unnecessary cell which operates at a higher frequency (e.g. millimeter wave) and/or indoor (e.g. like WiFi hot spot), a reduction of measurement overhead is achieved.

Figure 9:
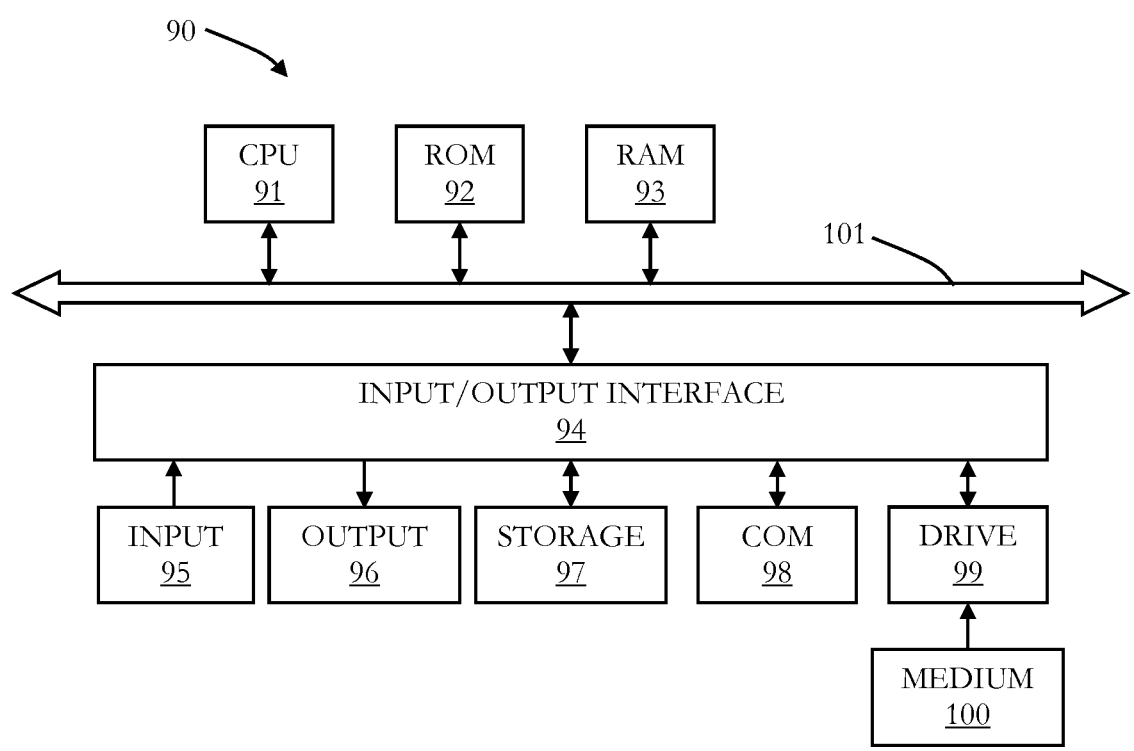
FIG. 9 illustrates a multi-purpose computer which can be implemented as base station or user equipment.

In the following, an embodiment of a general purpose computer 90 is described under reference of FIG. 9. The computer 90 can be such implemented that it can basically function as any type (anchor, slave, control plane, user plane, etc.) of base station, virtual/slave cell or user equipment as described herein. The computer has components 91 to 100, which can form a circuitry, such as anyone of the circuitries of the base station, virtual cell, slave cell, and user equipment, as described herein.

Embodiments which use software, firmware, programs or the like for performing the methods as described herein can be installed on computer 90, which is then configured to be suitable for the concrete embodiment.

The computer 90 has a CPU 91 (Central Processing Unit), which can execute various types of procedures and methods as described herein, for example, in accordance with programs stored in a read-only memory (ROM) 92, stored in a storage 97 and loaded into a random access memory (RAM) 93, stored on a medium 100 which can be inserted in a respective drive 99, etc.

The CPU 91, the ROM 92 and the RAM 93 are connected with a bus 101, which, in turn is connected to an input/output interface 94. The number of CPUs, memories and storages is only exemplary, and the skilled person will appreciate that the computer 90 can be adapted and configured accordingly for meeting specific requirements which arise, when it functions as a base station, virtual cell, and user equipment.

At the input/output interface 94 several components are connected: an input 95, an output 96, the storage 97, a communication interface 98 and the drive 99 into which a medium 100 (compact disc, digital video disc, compact flash memory, or the like) can be inserted.

The input 95 can be a pointer device (mouse, graphic table, or the like), a keyboard, a microphone, a camera, a touchscreen etc.

The output 96 can have a display (liquid crystal display, cathode ray tube display, light emittance diode display, etc.), loudspeakers, etc.

The storage 97 can have a hard disk, a solid state drive and the like.

The communication interface 98 can be adapted to communicate, for example, via a local area network (LAN), wireless local area network (WLAN), mobile telecommunications system (GSM, UMTS, LTE, etc.), Bluetooth, infrared, etc.

It should be noted that the description above only pertains to an example configuration of computer 90. Alternative configurations may be implemented with additional or other sensors, storage devices, interfaces or the like. For example, the communication interface 98 may support other radio access technologies than the mentioned UMTS and LTE.

When the computer 90 functions as a base station the communication interface 98 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the computer 90 may have one or more antennas and/or an antenna array. The present disclosure is not limited to any particularities of such protocols.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

It should be recognized that the embodiments describe methods with an exemplary ordering of method steps. The specific ordering of method steps is however given for illustrative purposes only and should not be construed as binding. Other changes of the ordering of method steps may be apparent to the skilled person.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using a software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A mobile telecommunications system method, comprising:
obtaining neighboring cell list information indicating neighboring cells;
obtaining classification information of cells included in the neighboring cell list information;
obtaining a mobility state of a user equipment; and
selecting at least one candidate cell to be measured based on the neighboring cell list information, the classification information and the mobility state of the user equipment.

(2) The mobile telecommunications system method of (1), further comprising obtaining threshold information including at least one threshold being associated with a mobility state of a user equipment.

(3) The mobile telecommunications system method of (2), wherein the at least one candidate cell is further selected based on the threshold information.

(4) The mobile telecommunications system method of anyone of (1) to (3), wherein the classification information is indicative of at least one of: a cell size, transmission power of at least one reference signal, suitability of a cell for a user equipment having a certain mobility state and operating frequency band information.

(5) The mobile telecommunications system method of anyone of (1) to (4), further comprising measuring at least one of power level and quality of a reference signal transmitted from the selected at least one candidate cell.

(6) The mobile telecommunications system method of anyone of (1) to (5), further comprising determining a cell ranking of the selected at least one candidate cell.

(7) The mobile telecommunications system method of (6), further comprising performing a cell reselection based on the cell ranking.

(8) The mobile telecommunications system method of anyone of (1) to (7), further comprising obtaining configuration information indicating measurement reporting information.

(9) The mobile telecommunications system method of (8), wherein the measurement reporting information includes at least one condition for triggering a measurement reporting about the measured selected candidate cell, wherein the condition is based on the mobility state of the user equipment.

(10) The mobile telecommunications system method of (9), further comprising setting the condition and trigger measurement reporting in case that the condition is met.

(11) The mobile telecommunications system method of anyone of (1) to (10), wherein the classification information includes first type classification information and second type classification information.

(12) The mobile telecommunications system method of anyone of (1) to (11), wherein an update frequency of the first type classification information differs from an update frequency of the second type classification information.

(13) The mobile telecommunications system method of (11) or (12), wherein the first type classification is associated with cells being deployed locally or dynamically.

(14) The mobile telecommunications system method of anyone of (11) to (13), wherein the second type classification is associated with stationary macro cells.

(15) The mobile telecommunications system method of anyone of (1) to (14), further comprising:
establishing a first connection between a first base station and the user equipment for exchanging signaling data; and
establishing a second connection between a second base station and the user equipment for exchanging data;
wherein the neighboring cell list information and the classification information are obtained from the first base station over the first connection and wherein the candidate cell is selected for the second connection.

(16) The mobile telecommunications system method of (2), wherein the threshold information is configured based on at least one of identification of network slicing and connection point of at least one entity of a core network.

(17) A mobile telecommunications system method, comprising:
estimating a mobility state of a user equipment;
determining, based on the mobility state of the user equipment, whether a reference signal of the user equipment is transmitted;
setting a beam-forming for a transmission signal to the user equipment, based on a measurement result of the reference signal from the user equipment.

(18) The mobile telecommunications system method of (17), wherein the reference signal from the user equipment is received from at least two antennas of a base station for the measurement of the reference signals.

(19) The mobile telecommunications system method of (18), further comprising estimating an angle of the reference signal and wherein the beam-forming is set, based on the angle, such that the transmission signal is directed towards the user equipment.

(20) The mobile telecommunications system method of anyone of (17) to (19), further comprising selecting a base station for setting the beaming-forming based on the measurement result.

(21) A user equipment for a mobile telecommunications system, the user equipment comprising circuitry being configured to:
receive neighboring cell list information indicating neighboring cells;
transmit classification information of cells included in the neighboring cell list information;
obtain a mobility state; and
selecting at least one candidate cell to be measured based on the neighboring cell list information, the classification information and the mobility state.

(22) The user equipment of (21), wherein the circuitry is further configured to obtain threshold information including at least one threshold being associated with a mobility state of the user equipment.

(23) The user equipment of (22), wherein the at least one candidate cell is further selected based on the threshold information.

(24) The user equipment of anyone of (21) to (23), wherein the classification information is indicative of at least one of: a cell size, transmission power of at least one reference signal, suitability of a cell for a user equipment having a certain mobility state and operating frequency band information.

(25) The user equipment of anyone of (21) to (24), wherein the circuitry is further configured to measure at least one of power level and quality of a reference signal transmitted from the selected at least one candidate cell.

(26) The user equipment of anyone of (21) to (25), wherein the circuitry is further configured to determining a cell ranking of the selected at least one candidate cell.

(27) The user equipment of (26), wherein the circuitry is further configured to performing a cell reselection based on the cell ranking.

(28) The user equipment of anyone of (21) to (27), wherein the circuitry is further configured to obtain configuration information indicating measurement reporting information.

(29) The user equipment of (28), wherein the measurement reporting information includes at least one condition for triggering a measurement reporting about the measured selected candidate cell, wherein the condition is based on the mobility state of the user equipment.

(30) The user equipment of (29), wherein the circuitry is further configured to set the condition and trigger measurement reporting in case that the condition is met.

(31) The user equipment of anyone of (21) to (30), wherein the classification information includes first type classification information and second type classification information.

(32) The user equipment of anyone of (21) to (31), wherein an update frequency of the first type classification information differs from an update frequency of the second type classification information.

(33) The user equipment of (31) or (32), wherein the first type classification is associated with cells being deployed locally or dynamically.

(34) The user equipment of anyone of (31) to (33), wherein the second type classification is associated with stationary macro cells.

(35) The user equipment of anyone of (21) to (34), wherein the circuitry is further configured to:
establishing a first connection between a first base station and the user equipment for exchanging signaling data; and
establishing a second connection between a second base station and the user equipment for exchanging data;
wherein the neighboring cell list information and the classification information are obtained from the first base station over the first connection and wherein the candidate cell is selected for the second connection.

(36) The user equipment of (22), wherein the threshold information is configured based on at least one of identification of network slicing and connection point of at least one entity of a core network.

(37) A user equipment for a mobile telecommunications system, the user equipment comprising circuitry being configured to:
estimate a mobility state;
determine, based on the mobility state of the user equipment, whether a reference signal of the user equipment is transmitted, wherein a beam-forming for a transmission signal to the user equipment is set, based on a measurement result of the reference signal from the user equipment.

(38) The user equipment of (37), wherein the reference signal from the user equipment is received from at least two antennas of a base station for the measurement of the reference signals.

(39) The user equipment of (38), wherein an angle of the reference signal is estimated and wherein the beam-forming is set, based on the angle, such that the transmission signal is directed towards the user equipment.

(40) The user equipment of anyone of (37) to (39), wherein a base station for setting the beaming-forming is selected based on the measurement result.

(41) A computer program comprising program code causing a computer to perform the method according to anyone of (1) to (20), when being carried out on a computer.

(42) A non-transitory computer-readable recording medium that stores therein a computer program product, which, when executed by a processor, causes the method according to anyone of (1) to (20) to be performed.

The invention claimed is:

1. A user equipment for a mobile telecommunications system, the user equipment comprising circuitry being configured to:
receive neighboring cell list information indicating neighboring cells;
transmit classification information of cells included in the neighboring cell list information, wherein classification information pertaining to dynamically deployed cells is transmitted with a first updating frequency and classification information pertaining to other neighboring cells is transmitted with a second updating frequency;
obtain a mobility state; and
select at least one candidate cell to be measured based on the neighboring cell list information, the classification information and the mobility state.

2. The user equipment of claim 1, wherein the circuitry is further configured to obtain threshold information including at least one threshold being associated with a mobility state of the user equipment.

3. The user equipment of claim 2, wherein the at least one candidate cell is further selected based on the threshold information.

4. The user equipment of claim 2, wherein the threshold information is configured based on at least one of identification of network slicing and connection point of at least one entity of a core network.

5. The user equipment of claim 1, wherein the classification information is indicative of at least one of: a cell size, transmission power of at least one reference signal, suitability of a cell for a user equipment having a certain mobility state and operating frequency band information.

6. The user equipment of claim 1, wherein the circuitry is further configured to measure at least one of power level and quality of a reference signal transmitted from the selected at least one candidate cell.

7. The user equipment of claim 1, wherein the circuitry is further configured to determine a cell ranking of the selected at least one candidate cell.

8. The user equipment of claim 7, wherein the circuitry is further configured to perform a cell reselection based on the cell ranking.

9. The user equipment of claim 1, wherein the circuitry is further configured to obtain configuration information indicating measurement reporting information.

10. The user equipment of claim 9, wherein the measurement reporting information includes at least one condition for triggering a measurement reporting about the measured selected candidate cell, wherein the condition is based on the mobility state of the user equipment.

11. The user equipment of claim 10, wherein the circuitry is further configured to set the condition and trigger measurement reporting in case that the condition is met.

12. The user equipment of claim 1, wherein the first updating frequency differs from the second updating frequency.

13. The user equipment of claim 1, wherein the circuitry is further configured to:
establish a first connection between a first base station and the user equipment for exchanging signaling data; and
establish a second connection between a second base station and the user equipment for exchanging data;
wherein the neighboring cell list information and the classification information are obtained from the first base station over the first connection and wherein the candidate cell is selected for the second connection.

14. A mobile telecommunications method, comprising:
receiving, by a user equipment, neighboring cell list information indicating neighboring cells;
transmitting, by the user equipment, classification information of cells included in the neighboring cell list information, wherein classification information pertaining to dynamically deployed cells is transmitted with a first updating frequency and classification information pertaining to other neighboring cells is transmitted with a second updating frequency;
obtaining, by the user equipment, a mobility state; and
selecting, by the user equipment, at least one candidate cell to be measured based on the neighboring cell list information, the classification information and the mobility state.

15. The method of claim 14, further comprising:
obtaining threshold information including at least one threshold being associated with a mobility state of the user equipment.

16. The method of claim 14, further comprising:
measuring at least one of power level and quality of a reference signal transmitted from the selected at least one candidate cell.

17. The method of claim 14, further comprising:
determining a cell ranking of the selected at least one candidate cell; and
performing a cell reselection based on the cell ranking.

18. The method of claim 14, further comprising:
obtaining configuration information indicating measurement reporting information, wherein the measurement reporting information includes at least one condition for triggering a measurement reporting about the measured selected candidate cell, wherein the condition is based on the mobility state of the user equipment; and
setting the condition and trigger measurement reporting in case that the condition is met.

19. The method of claim 14, further comprising:
establishing a first connection between a first base station and the user equipment for exchanging signaling data; and
establishing a second connection between a second base station and the user equipment for exchanging data,
wherein the neighboring cell list information and the classification information are obtained from the first base station over the first connection and wherein the candidate cell is selected for the second connection.

20. Circuitry for a user equipment, wherein the circuitry is configured to
receive neighboring cell list information indicating neighboring cells;
transmit classification information of cells included in the neighboring cell list information, wherein classification information pertaining to dynamically deployed cells is transmitted with a first updating frequency and classification information pertaining to other neighboring cells is transmitted with a second updating frequency;
obtain a mobility state; and
select at least one candidate cell to be measured based on the neighboring cell list information, the classification information and the mobility state.

* * * * *